United States Patent
Mendoza Hernández et al.

(10) Patent No.: US 12,090,957 B2
(45) Date of Patent: Sep. 17, 2024

(54) STRUCTURAL IMPACT ASSEMBLY AND VEHICLE HAVING STRUCTURAL IMPACT ASSEMBLY

(71) Applicant: Ford Global Technologies, LLC, Dearborn, MI (US)

(72) Inventors: Diego Eduardo Mendoza Hernández, Mexico City (MX); Alonso De Labastida, Huixquilucan (MX); Alejandro Eli Acosta Flores, Toluca (MX); Ulises T. Herrera Esquibel, Coyotepec (MX)

(73) Assignee: Ford Global Technologies, LLC, Dearborn, MI (US)

( * ) Notice: Subject to any disclaimer, the term of this patent is extended or adjusted under 35 U.S.C. 154(b) by 311 days.

(21) Appl. No.: 17/489,251

(22) Filed: Sep. 29, 2021

(65) Prior Publication Data

US 2023/0096529 A1 Mar. 30, 2023

(51) Int. Cl.
*B60R 3/02* (2006.01)
*B60R 3/00* (2006.01)
*B62D 21/15* (2006.01)
*B62D 25/02* (2006.01)

(52) U.S. Cl.
CPC ............ *B60R 3/002* (2013.01); *B60R 3/02* (2013.01); *B62D 21/15* (2013.01); *B62D 25/025* (2013.01)

(58) Field of Classification Search
CPC .......... B60R 3/002; B60R 3/02; B62D 21/15; B62D 21/157; B62D 25/025
See application file for complete search history.

(56) References Cited

U.S. PATENT DOCUMENTS

| | | | |
|---|---|---|---|
| 7,413,205 B2* | 8/2008 | Watson | B60R 3/02 280/166 |
| 7,513,518 B1* | 4/2009 | Mayville | B60R 3/002 280/169 |
| 7,513,565 B2* | 4/2009 | Watson | B60R 3/02 280/166 |
| 8,235,432 B2 | 8/2012 | Ryan et al. | |
| 9,771,024 B2* | 9/2017 | Hayes | B60R 3/02 |
| 9,937,865 B1* | 4/2018 | Oakey | B60R 3/002 |
| 10,518,727 B1* | 12/2019 | Barbuta | B60R 19/42 |
| 10,576,879 B1* | 3/2020 | Salter | B60Q 1/325 |
| 10,723,271 B2 | 7/2020 | Aitharaju et al. | |
| 10,786,971 B2 | 9/2020 | Roberts | |
| 11,091,212 B2* | 8/2021 | Toki | B62D 35/005 |
| 11,214,200 B1* | 1/2022 | Oakey | B60R 3/002 |

(Continued)

FOREIGN PATENT DOCUMENTS

JP 6477594 3/2019

*Primary Examiner* — Jeffrey J Restifo
(74) *Attorney, Agent, or Firm* — Burris Law, PLLC (57) ABSTRACT

A structural assembly for use in a motor vehicle includes a rocker and a running board. The motor vehicle includes a vehicle frame and a door. The rocker extends in a longitudinal direction of the motor vehicle. The running board is movably coupled to the vehicle frame between a deployed position and a stowed position in which an upper portion of the running board extends vertically above the rocker. The running board is configured to be positioned underneath the door and substantially flush with a lower portion of the door when the door is in a closed position and the running board is in the stowed position.

19 Claims, 11 Drawing Sheets

(56) References Cited

U.S. PATENT DOCUMENTS

| | | | |
|---|---|---|---|
| 11,414,017 B2* | 8/2022 | Qing | B60R 3/02 |
| 2004/0100063 A1* | 5/2004 | Henderson | B60R 3/02 |
| | | | 280/166 |
| 2005/0104318 A1* | 5/2005 | Lee | B60R 3/02 |
| | | | 280/166 |
| 2007/0138757 A1* | 6/2007 | Kuntze | B60R 3/002 |
| | | | 280/163 |
| 2007/0228748 A1* | 10/2007 | Ryan | B60R 19/38 |
| | | | 293/118 |
| 2008/0084045 A1* | 4/2008 | Filias | B60R 3/002 |
| | | | 280/166 |
| 2008/0116653 A1* | 5/2008 | Piotrowski | B60R 3/002 |
| | | | 280/166 |
| 2008/0179920 A1* | 7/2008 | Watson | B60R 3/002 |
| | | | 296/209 |
| 2008/0271936 A1* | 11/2008 | Kuntze | B60R 3/02 |
| | | | 29/11 |
| 2010/0044993 A1* | 2/2010 | Watson | B60R 3/002 |
| | | | 280/166 |
| 2010/0194070 A1* | 8/2010 | Stauffer | B60R 3/002 |
| | | | 280/166 |
| 2013/0323454 A1* | 12/2013 | Chapman | B29C 49/20 |
| | | | 428/74 |
| 2016/0355138 A1* | 12/2016 | Smith | B60R 3/002 |
| 2018/0001825 A1* | 1/2018 | Long | B60R 3/002 |
| 2018/0141486 A1* | 5/2018 | Stinson | B60R 3/002 |
| 2019/0092226 A1* | 3/2019 | Chen | F21S 43/40 |
| 2020/0062183 A1* | 2/2020 | Smith | B60R 3/02 |
| 2020/0139891 A1* | 5/2020 | Salter | B60R 3/002 |
| 2021/0053496 A1 | 2/2021 | Kaddouh | |
| 2021/0213884 A1* | 7/2021 | Dellock | B32B 37/15 |
| 2021/0221449 A1* | 7/2021 | Milani | B60R 3/002 |
| 2022/0306002 A1* | 9/2022 | Chung | B60R 3/002 |
| 2022/0332252 A1* | 10/2022 | Erasala | B62D 25/025 |
| 2022/0371515 A1* | 11/2022 | Dellock | B62D 29/008 |
| 2023/0021767 A1* | 1/2023 | Watson | B60R 3/02 |
| 2023/0053760 A1* | 2/2023 | Salter | E05F 15/75 |
| 2023/0096529 A1* | 3/2023 | Mendoza Hernández | B62D 25/025 |
| | | | 280/163 |

* cited by examiner

STRUCTURAL IMPACT ASSEMBLY AND VEHICLE HAVING STRUCTURAL IMPACT ASSEMBLY

FIELD

The present disclosure relates to a structural impact assembly and a vehicle having a structural impact assembly.

BACKGROUND

The statements in this section merely provide background information related to the present disclosure and may not constitute prior art.

Vehicles such as sport utility vehicles and pick-up trucks with an extended cab often include both a front door and a rear door on one side of the vehicle, and are designed to carry multiple occupants. Such vehicles may include running boards to further assist occupants during ingressing into and egressing out of the vehicle.

Integration of running boards into the structure of existing vehicles and providing efficient energy absorption capabilities in a variety of operating conditions may be challenging, primarily due to the characteristics of an impact barrier. The present disclosure addresses these potential challenges.

SUMMARY

This section provides a general summary of the disclosure and is not a comprehensive disclosure of its full scope or all of its features.

In one form, the present disclosure provides a structural assembly for use in a motor vehicle having a vehicle frame and a door. The structural assembly comprises a rocker and a running board. The rocker extends in a longitudinal direction of the motor vehicle. The running board is movably coupled to the vehicle frame between a deployed position and a stowed position in which an upper portion of the running board extends vertically above the rocker. The running board is configured to be positioned underneath the door and substantially flush with a lower portion of the door when the door is in a closed position and the running board is in the stowed position.

In variations of the structural assembly of the above paragraph, which may be implemented individually or in any combination: the running board includes stiffening members; the stiffening members are internal stiffening members including ribs extending in a lateral direction; a plurality of mounts rotatably couple the running board to the vehicle frame; a width of the running board is greater than a width of the rocker; the rocker has internal stiffening members; the rocker and the running board include internal stiffening members; a motor is operable to move the running board between the stowed position and the deployed position; the running board is laterally aligned with the rocker when the running board is in the stowed position; a coupling mechanism is configured to mechanically attach the running board to the vehicle frame when the running board is in the stowed position; the coupling mechanism includes a pin extending from the running board and a groove formed in the vehicle frame, the pin is received in the groove when the running board is in the stowed position.

In another form, the present disclosure provides a structural assembly for use in a motor vehicle having a door. The structural assembly comprises a vehicle frame and a running board. The vehicle frame includes a rocker extending in a longitudinal direction. The running board is rotatably coupled to the vehicle frame via mounts. The running board is rotatable between a deployed position and a stowed position in which the running board is laterally aligned with the rocker. The running board is configured to be positioned underneath the door and substantially flush with a lower portion of the door when the door is in a closed position and the running board is in the stowed position.

In variations of the structural assembly of the above paragraph, which may be implemented individually or in any combination: the vehicle frame does not include b-pillars; an upper portion of the running board extends vertically above the rocker when in the stowed position; a coupling mechanism mechanically attaches the running board to the vehicle frame when the running board is in the stowed position, the coupling mechanism mechanically attaches the running board to at least one of a hinge pillar and C-pillar of the vehicle frame when the running board is in the stowed position.

In yet another form, the present disclosure provides an electric vehicle comprising a vehicle frame, a door, a running board, and a coupling mechanism. The vehicle frame supports a battery pack of the electric vehicle and includes a rocker extending in a longitudinal direction. The vehicle frame does not include b-pillars. The door is rotatably coupled to the vehicle frame of the electric vehicle. The running board is rotatably coupled to the vehicle frame via mounts. The running board is rotatable between a deployed position and a stowed position in which an upper portion of the running board extends vertically above the rocker. The coupling mechanism mechanically attaches the running board to the vehicle frame when the running board is in the stowed position. The running board is configured to be positioned underneath the door and substantially flush with a lower portion of the door when the door is in a closed position and the running board is in the stowed position. The running board is laterally aligned with the rocker when the running board is in the stowed position.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
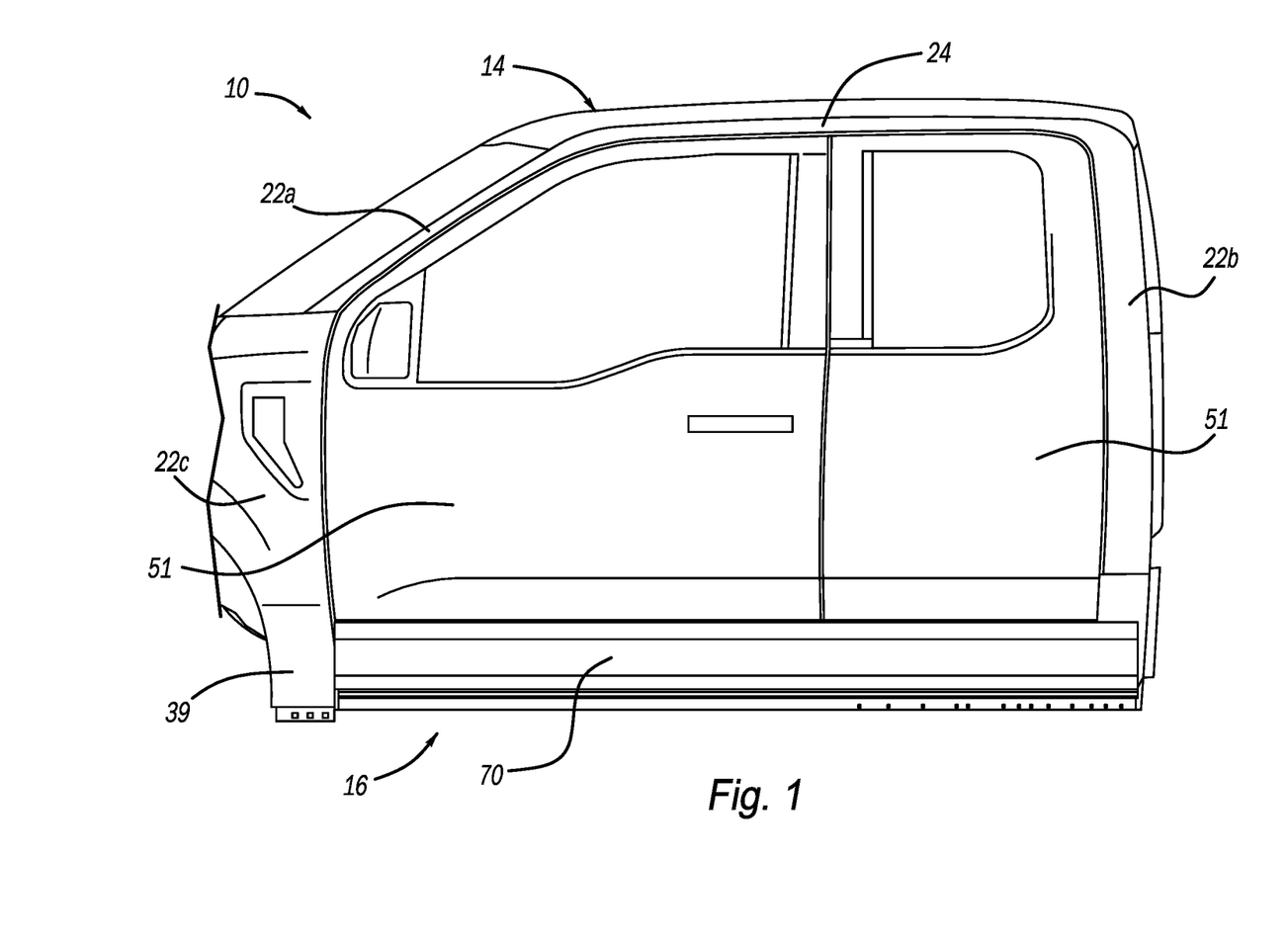
FIG. 1 is a side view of a portion of a vehicle including a structural impact assembly according to the principles of the present disclosure.
Figure 2:
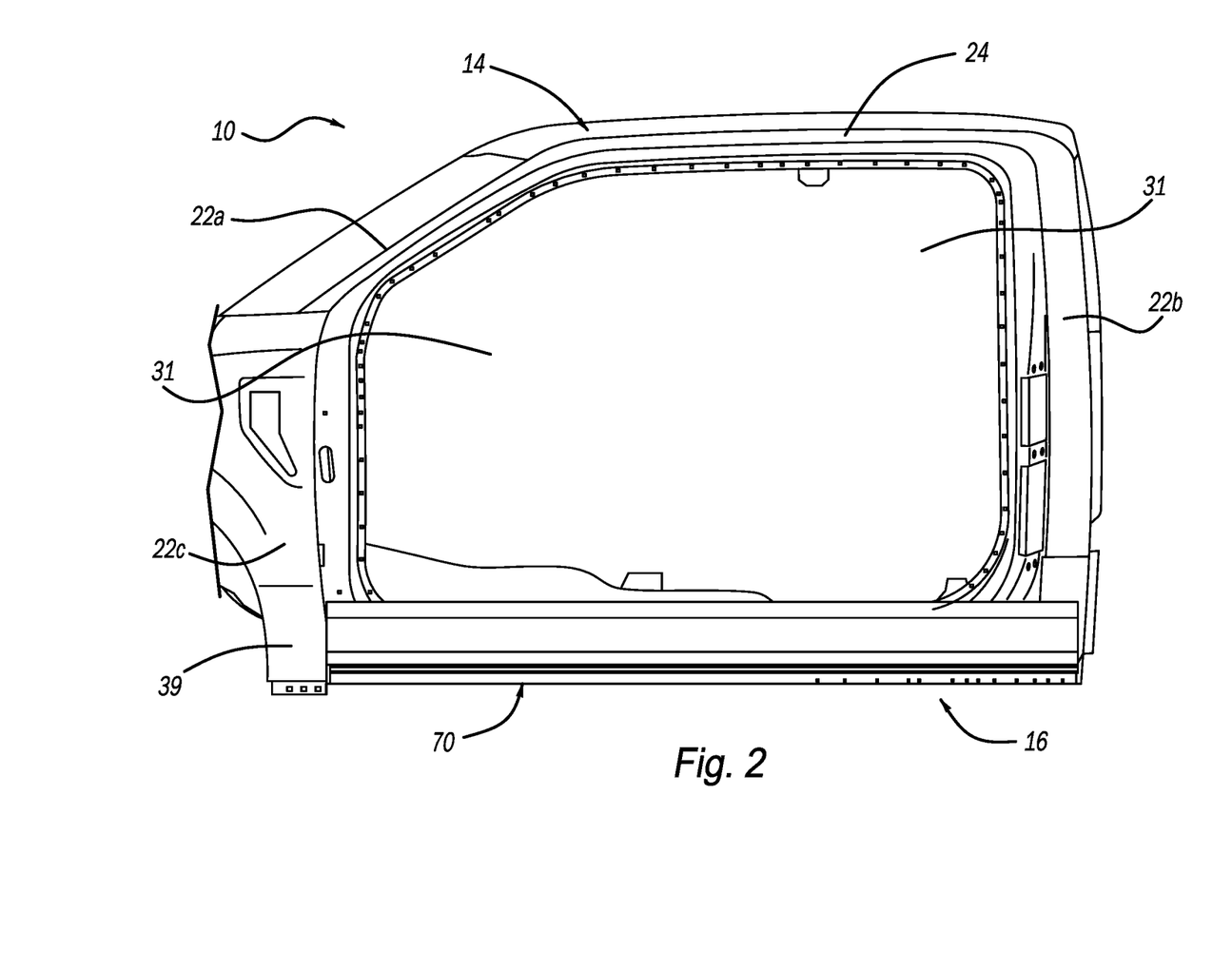
FIG. 2 is a side view of the portion of the vehicle of FIG. 1 with the doors removed for clarity and without B-pillars.
Figure 3:
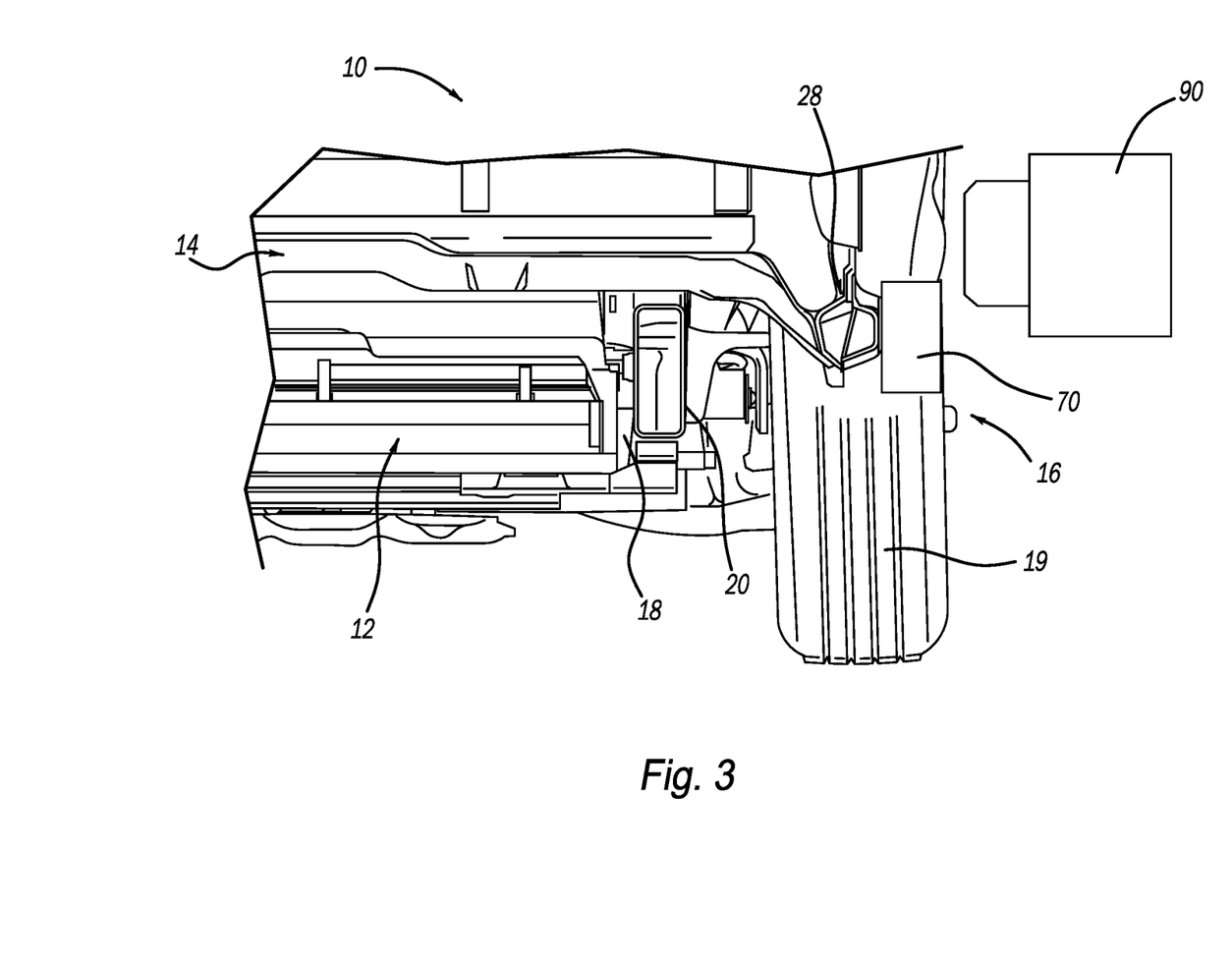
FIG. 3 is a back view of a portion of the vehicle of FIG. 1 showing a battery pack and a portion of the structural impact assembly.

With reference to FIGS. 1-3, a vehicle 10 such as an electric vehicle is illustrated. In the example provided, the electric vehicle is a battery electric vehicle (BEV). In other examples, the electric vehicle may be a hybrid electric vehicle (HEV), a plug-in electric vehicle (PHEV), or a fuel cell vehicle, among others. The vehicle 10 includes a battery pack 12 (FIG. 3), a vehicle frame 14, and a structural impact assembly 16. The battery pack 12 may be rechargeable and may include lithium-ion batteries or any other suitable electrical power storage units. The battery pack 12 may be disposed at various locations of the vehicle 10 and may be mounted to the vehicle frame 14. In this way, the battery pack 12 is supported by the vehicle frame 14 and is remote from a passenger cabin and cargo compartments (not shown) of the vehicle 10, therefore, not occupying space that would otherwise be available for passengers or cargo. The battery pack 12 powers a rear motor (not shown) to drive a set of rear wheels (not shown). Similarly, the battery pack 12 powers a front motor (not shown) to selectively drive a set of front wheels 19 (only one front wheel 19 shown in FIG. 3). The battery pack 12 includes an outer support frame 18.

Figure 4:
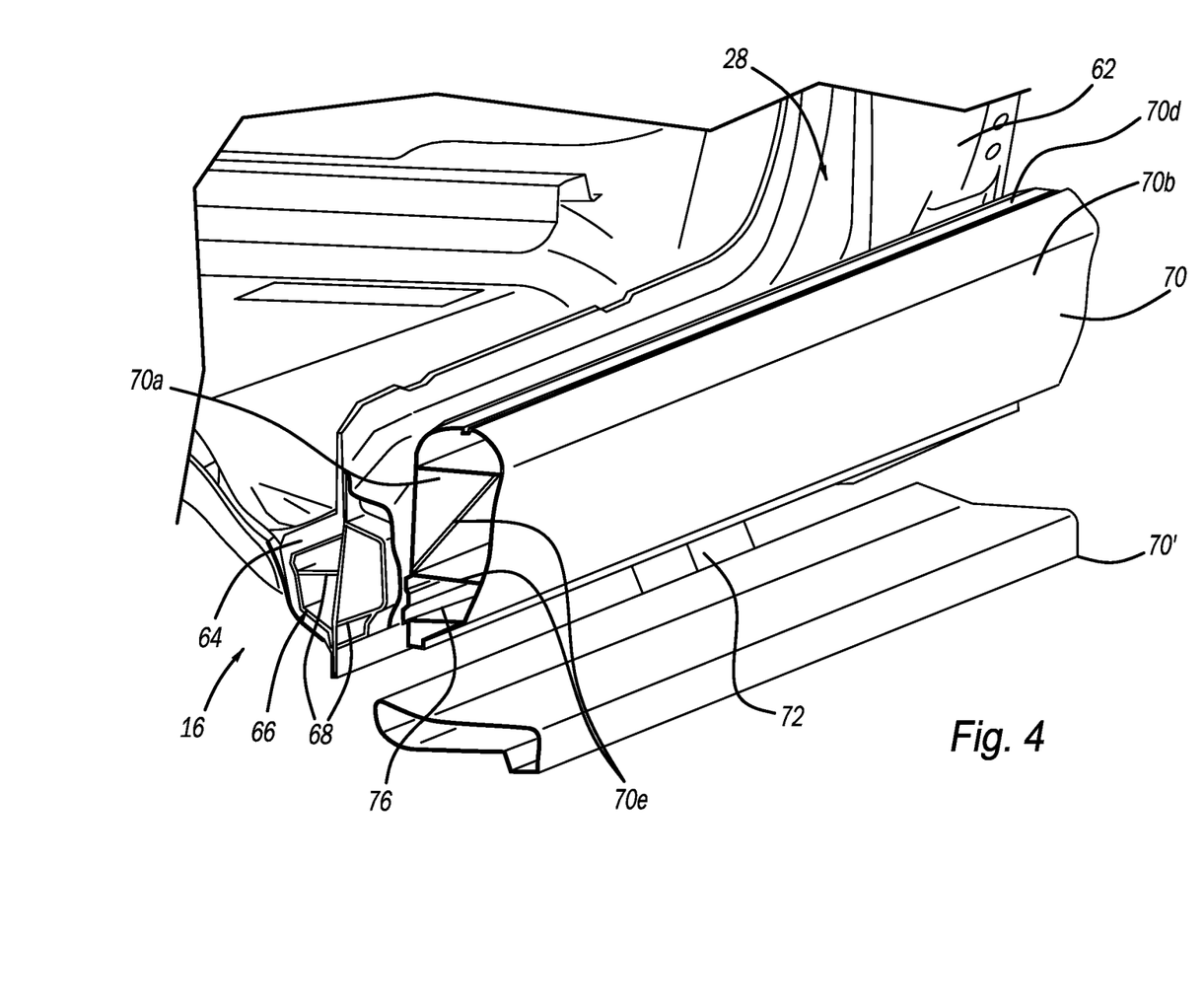
FIG. 4 is a perspective view of a portion of a running board of the structural impact assembly of FIG. 1 in the stowed and deployed positions.
Figure 5:
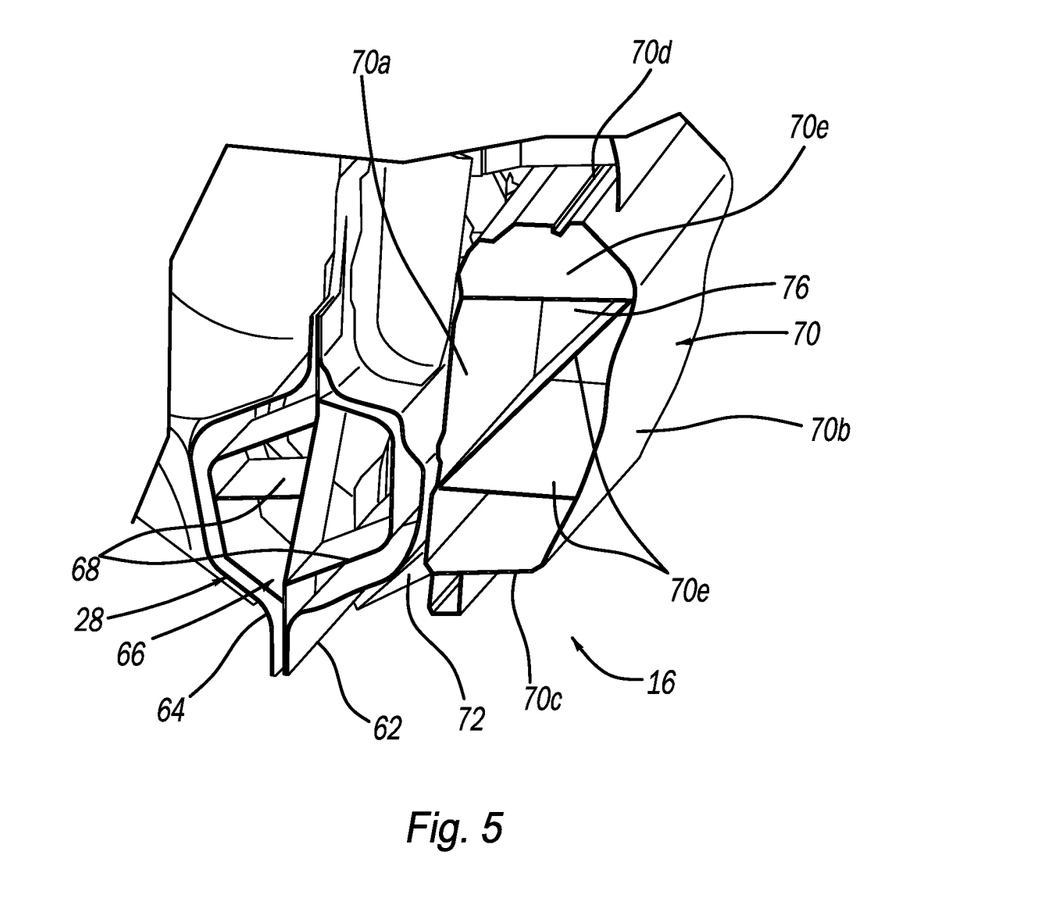
FIG. 5 is a cross-sectional view of a portion of the vehicle of FIG. 1 with the running board in the stowed position.
Figure 6:
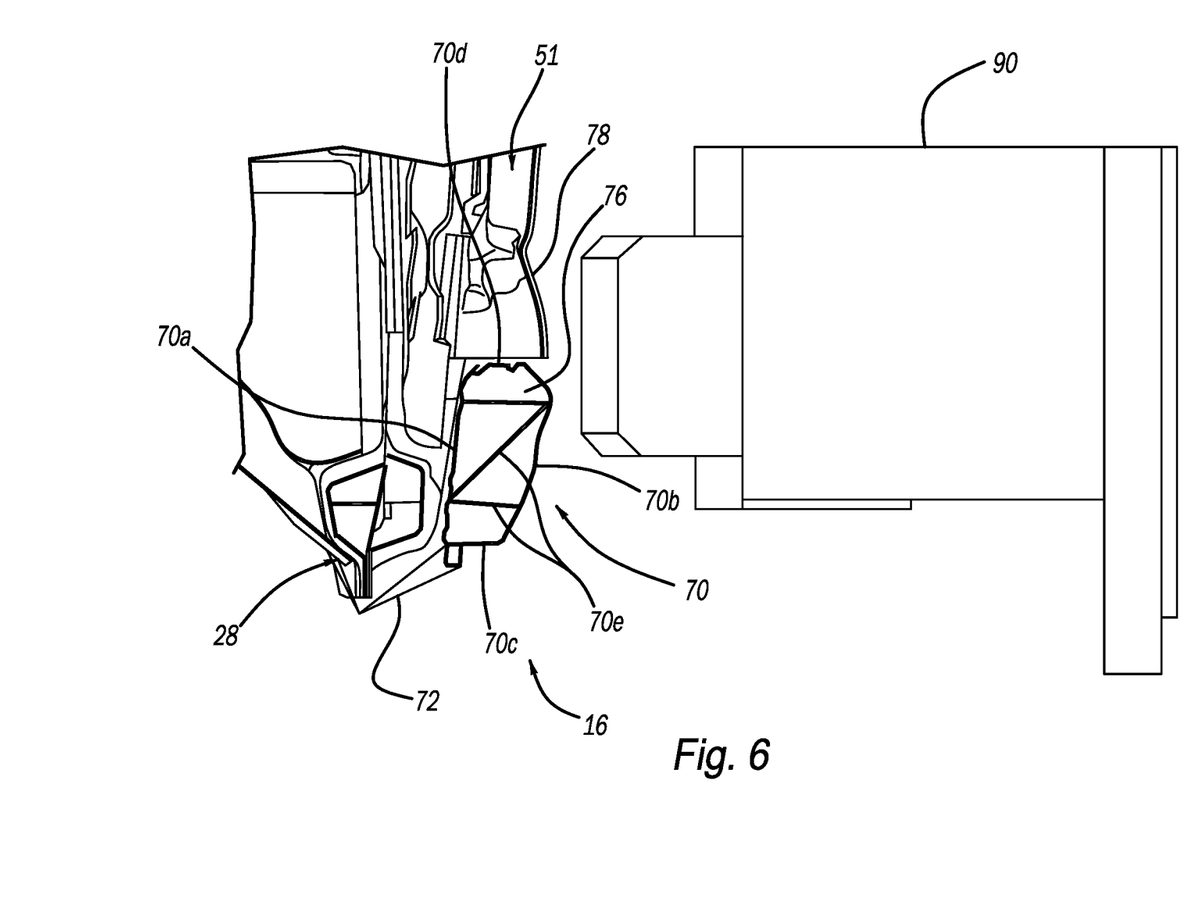
FIG. 6 is a cross-sectional view of a portion of the vehicle of FIG. 1 with the running board in the stowed position and a barrier proximate the structural impact assembly.

With additional reference to FIGS. 4-6, the vehicle frame 14 includes a plurality of pillars (e.g., A-pillars 22*a* (only one shown in FIGS. 1 and 2), C-pillars 22*b* (only one shown in FIGS. 1 and 2), hinge pillars 22*c* (only one shown in FIGS. 1 and 2)), roof rails 24 (only one shown in FIGS. 1 and 2), and rockers 28 (only one shown in FIGS. 3-6). The A-pillars 22*a*, the C-pillars 22*b*, the hinge pillars 22*c*, the rockers 28 and the roof rails 24 cooperate to define door openings 31 (FIG. 2) in the vehicle frame 14. Doors 51 are rotatably coupled to the hinge pillars 22*c* and the C-pillars 22*b* between a closed position (FIG. 1) in which the doors 51 are disposed within the door openings 31 and an open position (not shown) in which the doors 51 are removed from the door openings 31. Each hinge pillar 22*c* may include an outer member and an inner member that is secured to the outer member via welding. In some configurations, the outer member and the inner member may be secured to each other via mechanical fasteners or any other suitable attachment means. The outer member and the inner member define a cavity that houses a portion of the structural impact assembly 16. In the example illustrated herein, the vehicle frame 14 is without B-pillars. However, it should be understood that the structural impact assembly 16 disclosed herein may also be incorporated into vehicles having B-pillars without departing from the scope of the present disclosure.

Each rocker 28 is elongated and extends along the longitudinal direction of the vehicle 10. The rocker 28 is also secured to a respective battery cage longitudinal member 20. A front end of the rocker 28 is housed within and secured to a respective hinge pillar 22*c* (e.g., the front end of the rocker 28 is disposed within the cavity of the respective hinge pillar 22*c*). The rocker 28 is secured to the respective battery cage longitudinal member 20 and a lower portion 39 of the respective hinge pillar 22*c* with mechanical fasteners, for example.

As best shown in FIGS. 4 and 5, the rocker 28 includes an outer member 62, an inner member 64, and an inner rocker 66. The outer member 62 is secured to the inner member 64 via welding. In some configurations, the outer member 62 is secured to the inner member 64 with mechanical fasteners. The inner member 64 may be secured to the battery cage longitudinal member 20. The inner rocker 66 is housed within a cavity formed via the outer and inner members 62, 64, and extends along an inboard portion of the outer member 62. The inner rocker 66 may include internal stiffening members 68 that are configured to absorb energy during a side vehicle impact event. In the example illustrated, the internal stiffening members 68 are ribs or webbing. In other examples, a foam material may be provided instead of, or in addition to, the internal stiffening members 68 to further absorb energy during a side vehicle impact event.

Figure 7:
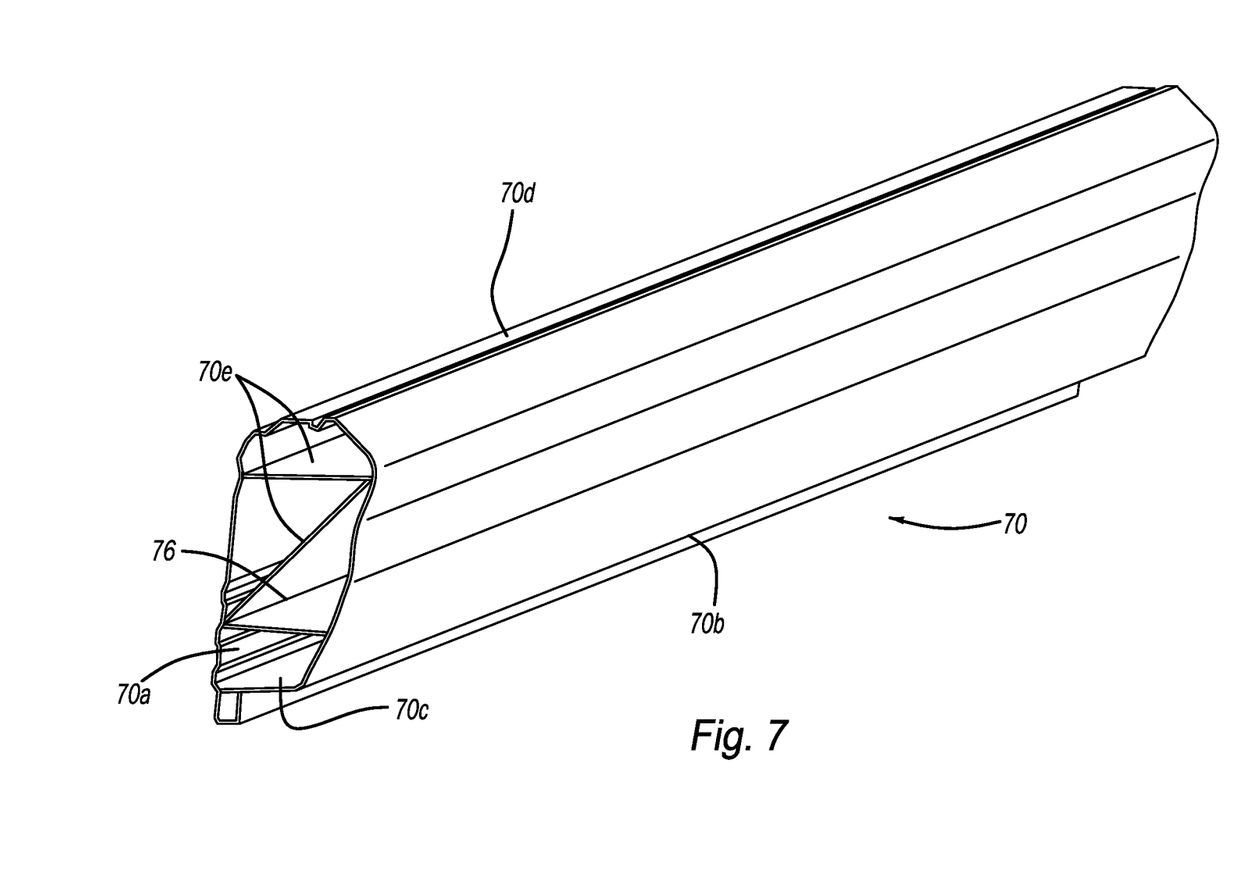
FIG. 7 is a perspective view of a portion of the running board of FIG. 4.

With additional reference to FIG. 7, the structural impact assembly 16 includes the vehicle frame 14, a pair of running boards or step bars 70 (only one shown in FIGS. 1-7), and a plurality of mounts 72 (only one shown in FIGS. 4-6). Each running board 70 extends along a respective side of the vehicle 10 in the longitudinal direction and is movably coupled to the vehicle frame 14 (e.g., movably coupled to a respective rocker 28 of the vehicle frame 14) via the mounts 72. The running board 70 may be generally rectangular shape and may be made of a metal material (e.g., aluminum). The running board 70 may be movably coupled (e.g., rotatably coupled) to the respective rocker 28 between a deployed position (shown as reference numeral 70' in FIG. 4) in which the running board 70 facilitates access into the vehicle 10 and a stowed position (FIGS. 1-6) in which the running board 70 acts an energy absorption member during a side impact event. When the running board 70 is in the stowed position, the running board 70 is laterally aligned with the respective rocker 28 and extends further upwardly in a vertical direction than the respective rocker 28. When the doors 51 are in the closed position and the running board 70 is in the stowed position, the running board 70 is configured to be positioned underneath respective doors 51 and substantially flush with a lower portion of the respective doors 51 (FIG. 6).

When the running board 70 is in the deployed position, the vehicle 10 may be in a first vehicle mode (e.g., normal operational mode). When the running board 70 is in the deployed position, the vehicle 10 may be in a second vehicle mode (e.g., an impact mode).

With reference to FIGS. 4-7, the running board 70 includes an upper wall or platform 70*a*, a lower wall 70*b*, opposing side walls 70*c*, 70*d*, and internal stiffening members 70*e*. The walls 70*a*, 70*b*, 70*c*, 70*d* cooperate to form a cavity 76 that houses the internal stiffening members 70*e*. When the running board 70 is in the deployed position, the walls 70*a*, 70*b* extend in the lateral direction. In this way, a user may step onto the upper wall 70a to facilitate ingressing into and egressing out of the passenger cabin of the vehicle 10. The upper wall 70a may further include gripping elements formed thereon to facilitate grip with the foot of the user while ingressing into and egressing out of the passenger cabin of the vehicle 10. When the running board 70 is in the stowed position, the walls 70a, 70b extend in the vertical direction. When the doors 51 are in the closed position and the running board 70 is in the stowed position, the running board 70 is substantially flush with a lower portion of the respective doors 51 (i.e., the lower wall 70b is substantially flush with outer panels 78 of the doors 51) so as to make for a more natural appearance of the doors 51. The running board 70 may have a width that is greater than a width of the rocker 28. In this way, when the running board 70 is in the stowed position, the running board 70 extends vertically upward further than the rocker 28 so as to engage a barrier 90 during a side impact event. In one example, the width of the running board 70 may be at least 2 times greater than the width of the rocker 28.

The internal stiffening members 70e may be positioned within the cavity 76 of the running board 70 and may extend between the upper and lower walls 70a, 70b. The internal stiffening members 70e may also extend along an entire length of the running board 70. In one example, the stiffening members 70e may be ribs or webbing. The stiffening members 70e may also extend in a lateral direction. In another example, structural foam (not shown) may be disposed within the cavity 76 instead of, or in addition to, the ribs or webbing.

Figure 8:
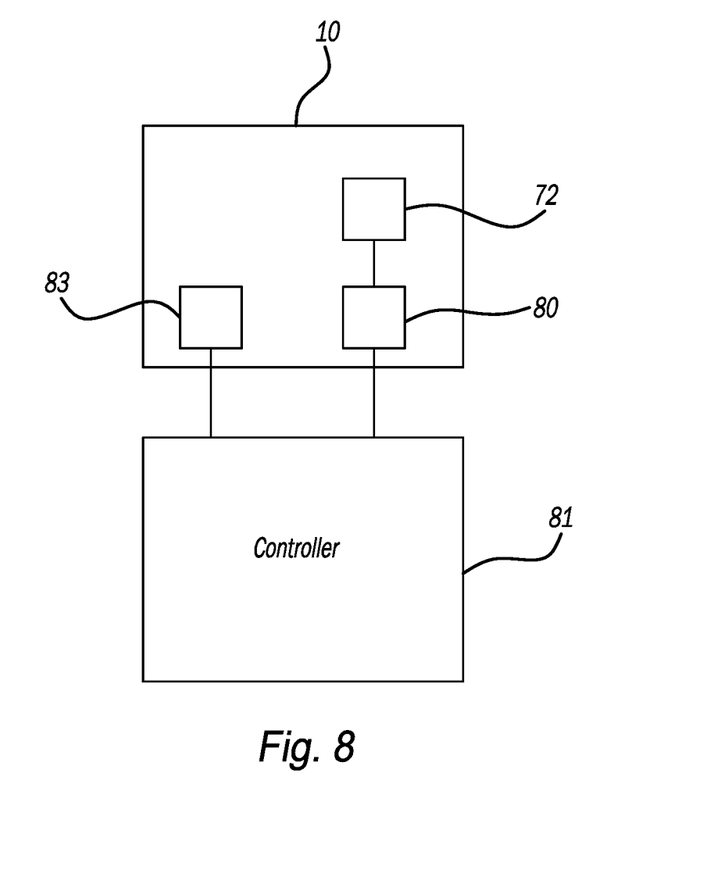
FIG. 8 is a schematic block diagram showing components of the structural impact assembly.

The plurality of mounts 72 secure a respective running board 70 to a respective rocker 28. That is, a first end of each mount 72 is secured to the respective running board 70 (e.g., coupled to at least one of the lower wall 70b and side wall 70c) and a second end of each mount 72 is secured to the respective rocker 28 (or a plate that is in turn secured to the respective rocker 28). As shown in FIG. 8, a motor 80 may be operably connected to at least one of the mounts 72 on a respective side of the vehicle 10 and may move the running board 70 between the stowed and deployed positions. For example, the motor 80 may be similar to one of the motors shown and described in U.S. Pat. No. 8,235,432, which is commonly owned with the present application and the entire disclosure of which is incorporated herein by reference. A controller 81 may be in communication with the motor 80 and sensors 83 associated with the vehicle 10. The controller 81 may operate the motor 80 to move the running board 70 from the deployed position to the stowed position based in part on data received from the sensors 83. For example, if the controller 81 determines based on data received from the sensors 83 that a side impact event is imminent, the controller 81 may operate the motor 80 to move the running board 70 from the deployed position to the stowed position.

Figure 9:
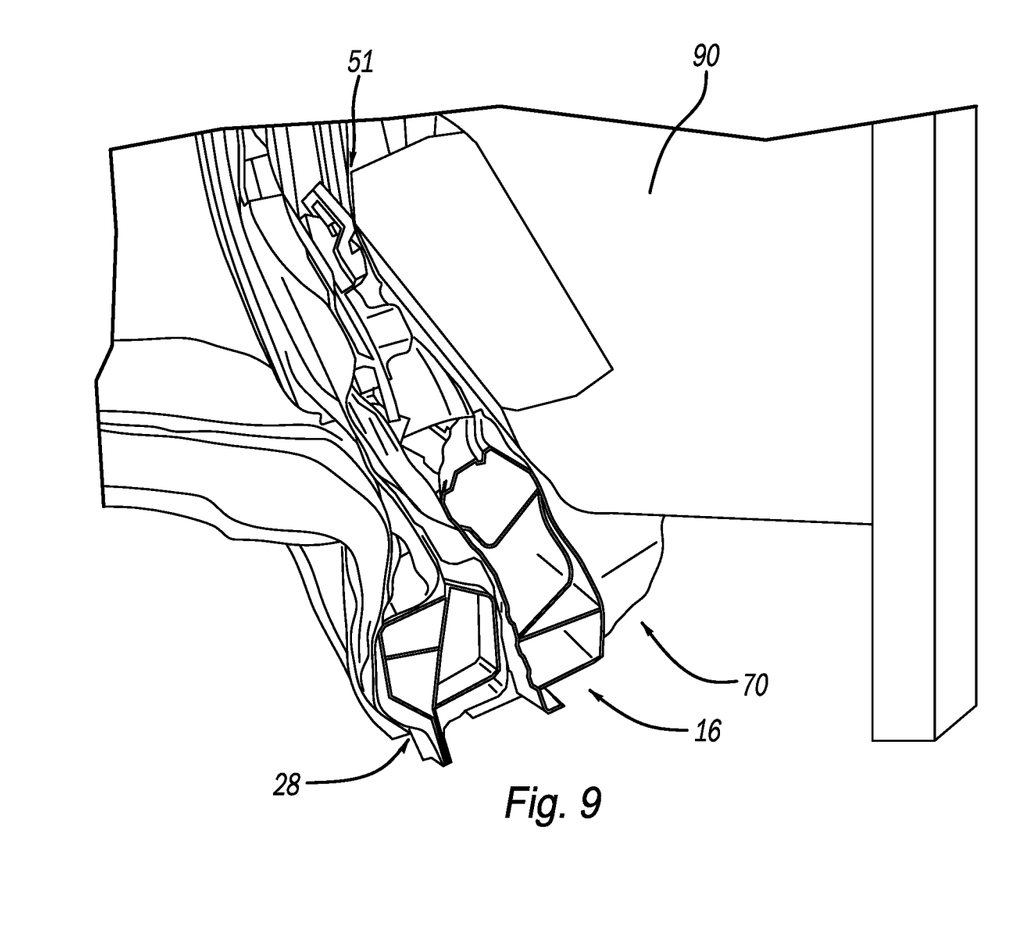
FIG. 9 is a cross-sectional view of a portion of the vehicle of FIG. 1 showing intrusion during a side impact event.

With reference to FIG. 9, the structural impact assembly 16 of the present disclosure further reduces intrusion into the vehicle frame 14 upon the vehicle 10 colliding with the barrier 90 during a side impact event, for example. That is, the running board 70 extending vertically above the rocker 28 is configured to engage the barrier 90 and absorb energy from the side impact event. This also causes the load from the barrier 90 to be distributed away from the battery pack 12, which is advantageous particularly in vehicles having a frame that does not include B-pillars.

Figure 10:
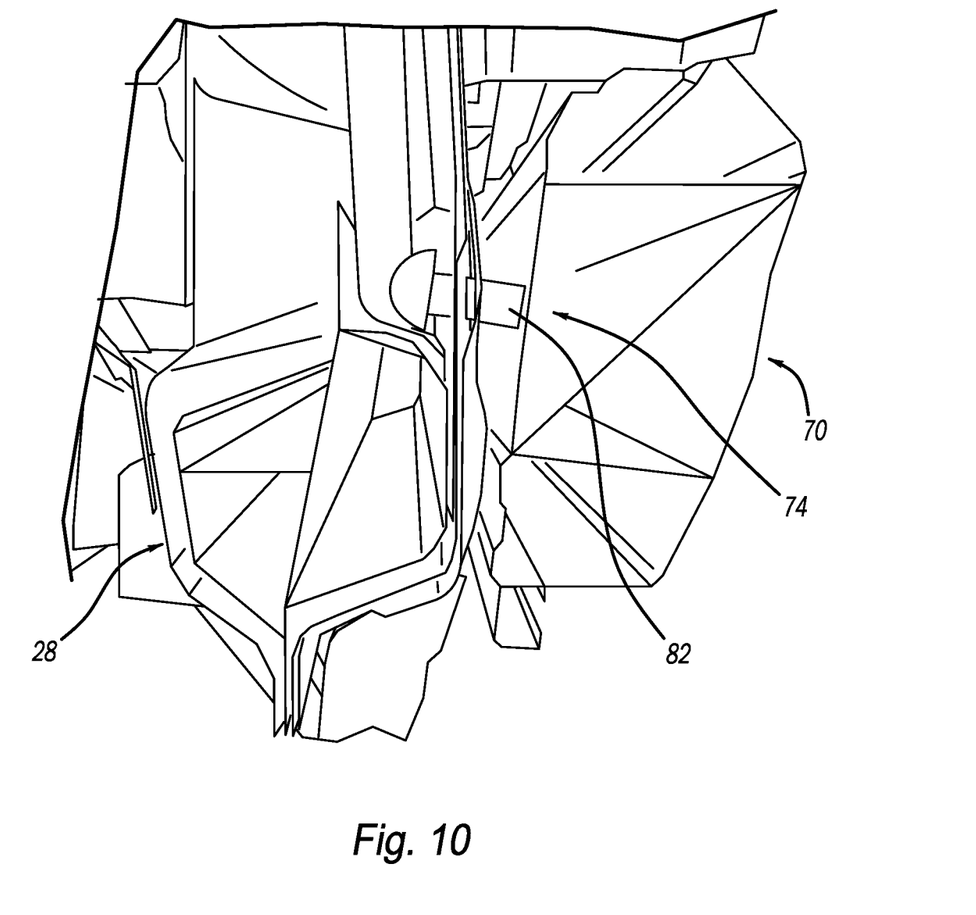
FIG. 10 is a cross-sectional view of a portion of the vehicle with another running board in the stowed position.
Figure 11:
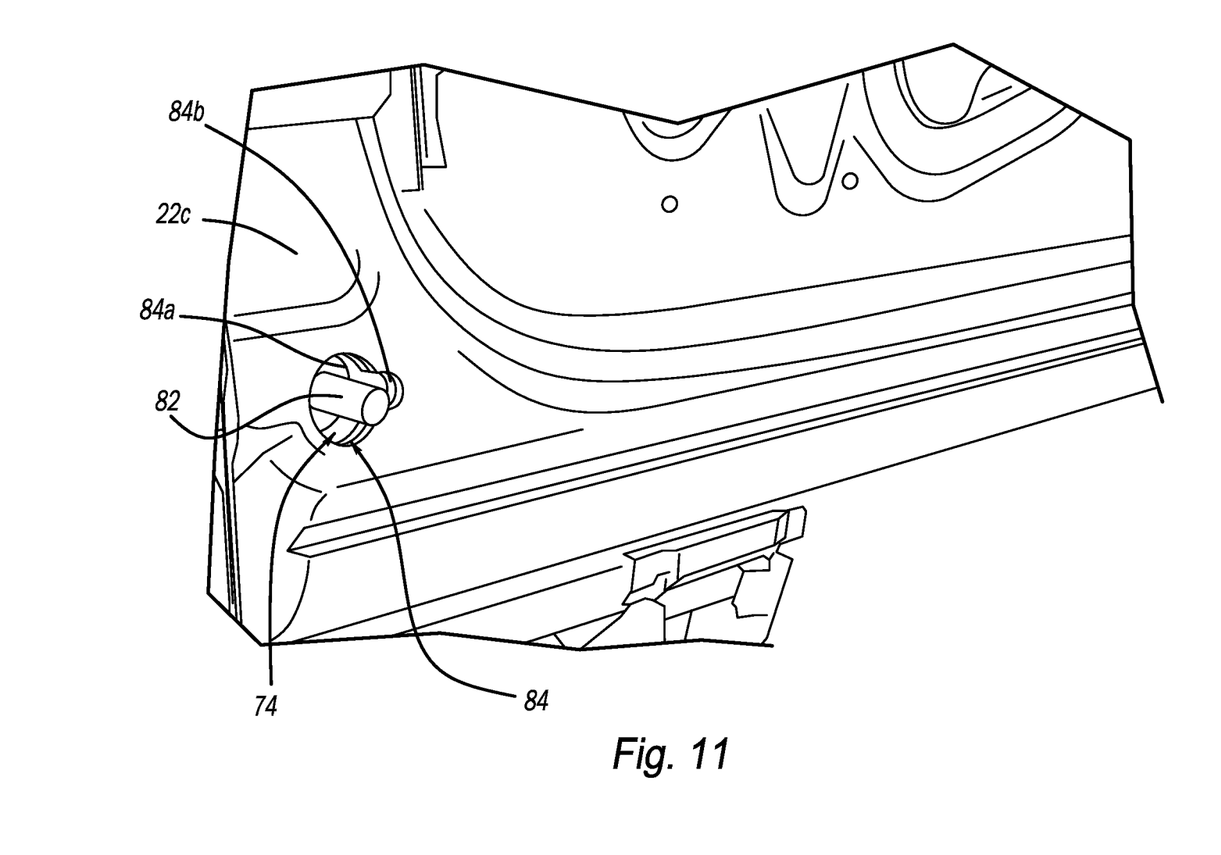
FIG. 11 is a perspective view of a portion of the vehicle including a pin of the running board of FIG. 10 extending through an opening in a frame of the vehicle with the running board removed for clarity.

In another form, as shown in FIGS. 10 and 11, one or more coupling mechanisms 74 are configured to mechanically attach the running board 70 to the vehicle frame 14. In one example, each coupling mechanism 74 includes a pin 82 secured to and extending from the running board 70. The pin 82 is received in the groove or opening 84 (FIG. 11) formed in the hinge pillar 22c, for example, of the vehicle frame 14 when the running board 70 is in the stowed position. When the vehicle 10 collides with the barrier 90, for example, during a side impact event, the pin 82 moves from a first section 84a of the opening 84 into a second section 84b of the opening 84, thereby mechanically securing the running board 70 to the vehicle frame 14. That is, the second section 84b has a smaller area than an area of the first section 84a such that a head of the pin 82 is allowed to move in and out of the first section 84a when the pin 82 is located in the first section 84a and is inhibited from moving in and out of the second section 84b when the pin 82 is located in the second section 84b. In this way, the running board 70 is mechanically attached to the vehicle frame 14, which improves the stiffness of the vehicle frame 14 during the side impact event. Additionally or alternatively, another coupling mechanism (not shown) may mechanically attach the running board 70 to the C-pillar 22b in a similar manner as described above to further improve the stiffness of the vehicle frame 14 during the side impact event.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural assembly for use in a motor vehicle having a vehicle frame and a door, the structural assembly comprising:
    a rocker extending in a longitudinal direction of the motor vehicle; and
    a running board movably coupled to the vehicle frame between a deployed position and a stowed position in which an upper portion of the running board extends vertically above the rocker,
    wherein the running board is configured to be positioned underneath the door and substantially flush with a lower portion of the door when the door is in a closed position and the running board is in the stowed position.

2. The structural assembly of claim 1, wherein the running board includes stiffening members.

3. The structural assembly of claim 2, wherein the stiffening members are internal stiffening members including ribs extending in a lateral direction.

4. The structural assembly of claim 1, further comprising a plurality of mounts rotatably coupling the running board to the vehicle frame.

5. The structural assembly of claim 1, wherein a width of the running board is greater than a width of the rocker.

6. The structural assembly of claim 1, wherein the rocker has internal stiffening members.

7. The structural assembly of claim 1, wherein the rocker and the running board include internal stiffening members.

8. The structural assembly of claim 1, further comprising a motor operable to move the running board between the stowed position and the deployed position.

9. The structural assembly of claim 1, wherein the running board is laterally aligned with the rocker when the running board is in the stowed position.

10. The structural assembly of claim 1, further comprising:
    the vehicle frame; and
    a coupling mechanism configured to mechanically attach the running board to the vehicle frame when the running board is in the stowed position.

11. The structural assembly of claim 10, wherein the coupling mechanism includes a pin extending from the running board and a groove formed in the vehicle frame, the pin received in the groove when the running board is in the stowed position.

12. A structural assembly for use in a motor vehicle having a door, the structural assembly comprising:
    a vehicle frame including a rocker extending in a longitudinal direction; and
    a running board rotatably coupled to the vehicle frame via mounts, the running board rotatable between a deployed position and a stowed position in which the running board is laterally aligned with the rocker,
    wherein the running board is configured to be positioned underneath the door and substantially flush with a lower portion of the door when the door is in a closed position and the running board is in the stowed position,
    wherein an upper portion of the running board extends vertically above the rocker when in the stowed position.

13. The structural assembly of claim 12, wherein the vehicle frame does not include b-pillars.

14. The structural assembly of claim 12, wherein the running board includes stiffening members.

15. The structural assembly of claim 14, wherein the stiffening members are internal stiffening members including ribs extending in a lateral direction.

16. The structural assembly of claim 12, wherein a width of the running board is greater than a width of the rocker.

17. The structural assembly of claim 12, further comprising:
    a coupling mechanism mechanically attaching the running board to the vehicle frame when the running board is in the stowed position,
    wherein the coupling mechanism mechanically attaches the running board to at least one of a hinge pillar and C-pillar of the vehicle frame when the running board is in the stowed position.

18. The structural assembly of claim 12, wherein the rocker and the running board include internal stiffening members.

19. An electric vehicle comprising:
    a vehicle frame supporting a battery pack of the electric vehicle and including a rocker extending in a longitudinal direction, the vehicle frame not including b-pillars;
    a door rotatably coupled to the vehicle frame of the electric vehicle;
    a running board rotatably coupled to the vehicle frame via mounts, the running board rotatable between a deployed position and a stowed position in which an upper portion of the running board extends vertically above the rocker; and
    a coupling mechanism mechanically attaching the running board to the vehicle frame when the running board is in the stowed position,
    wherein the running board is configured to be positioned underneath the door and substantially flush with a lower portion of the door when the door is in a closed position and the running board is in the stowed position, and
    wherein the running board is laterally aligned with the rocker when the running board is in the stowed position.

* * * * *